Dec. 9, 1930.  P. GRESSER  1,784,434
GREASE GUN
Filed March 15, 1928  2 Sheets-Sheet 2
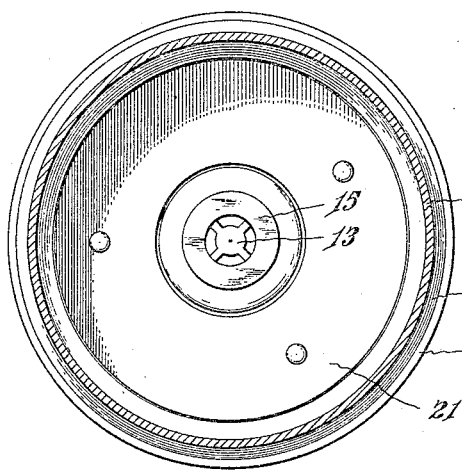
FIG.3.
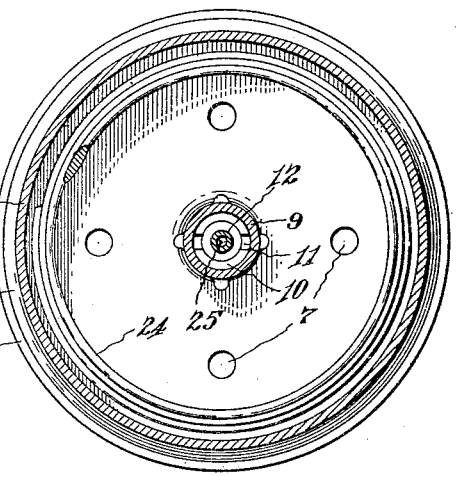
FIG.4.
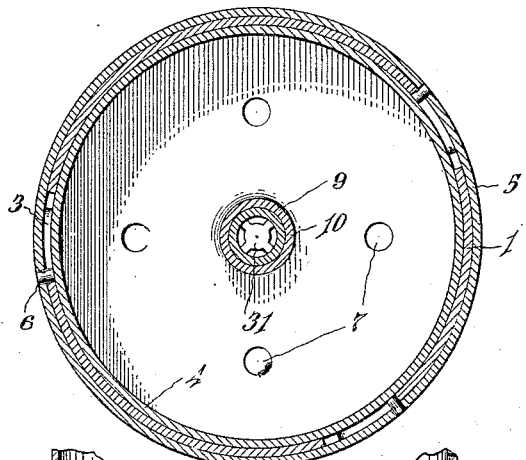
FIG.5.
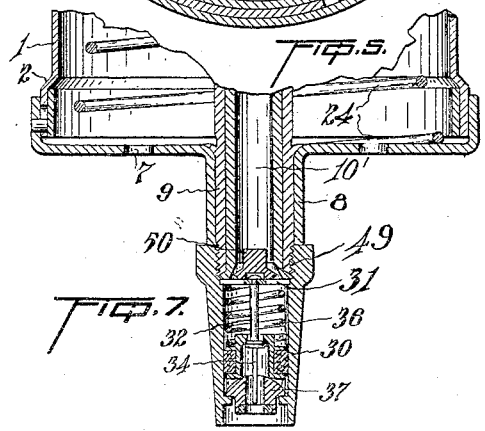
FIG.6.
FIG.7.
Inventor
Peter Gresser
Attorney Patented Dec. 9, 1930

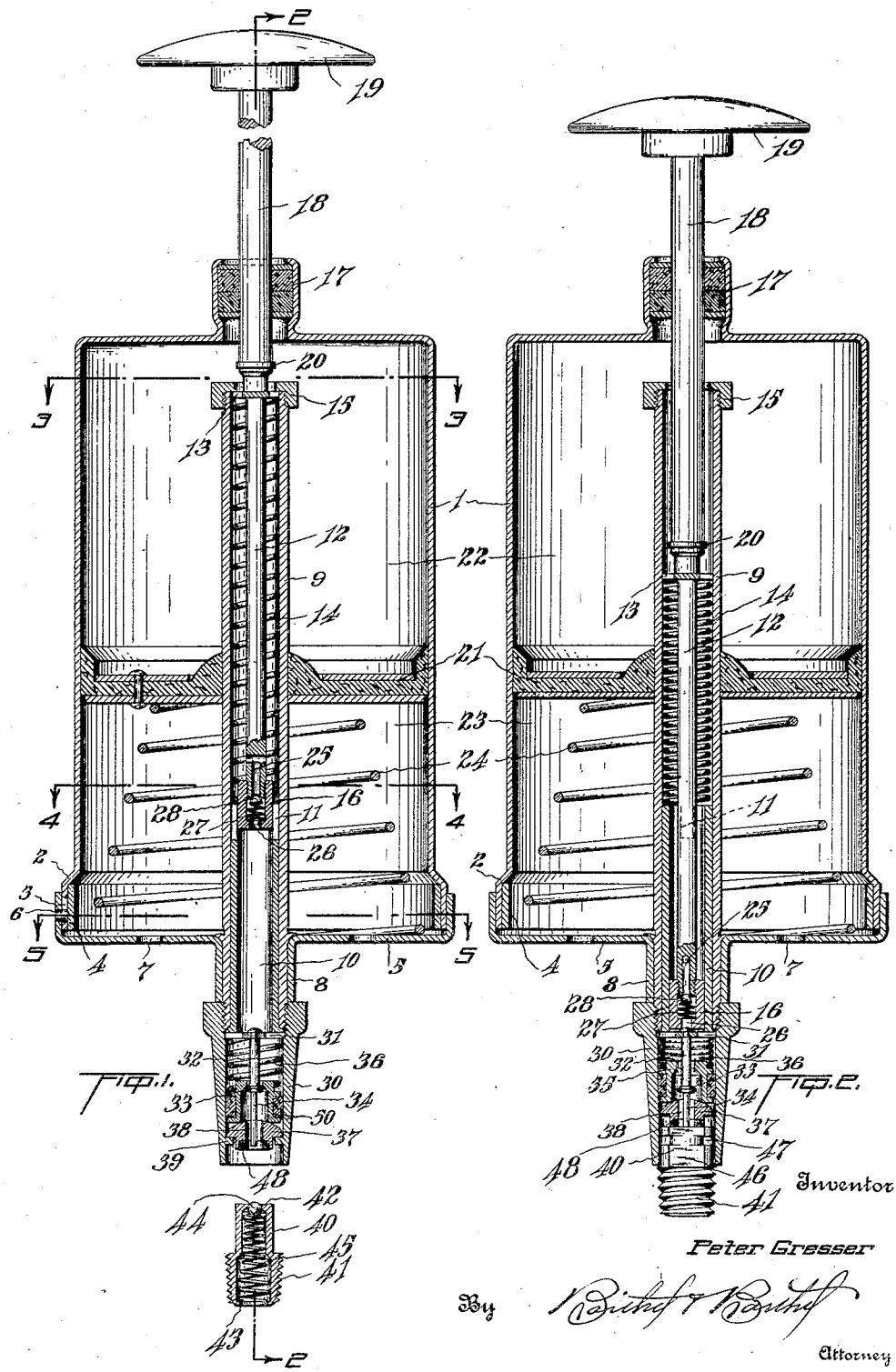

1,784,434

UNITED STATES PATENT OFFICE

PETER GRESSER, OF DETROIT, MICHIGAN

GREASE GUN

Application filed March 15, 1928. Serial No. 261,985.

The present invention pertains to a novel grease gun adapted for the lubrication of bearings such as, for example, the bearings of a motor vehicle.

The principal object of the invention is to provide a device of this character capable of delivering a predetermined or constant amount of lubricant on each operation.

In the accomplishment of this object, the body or receiver of the device is in the form of a cylinder having a piston slidably mounted therein. One side of the piston forms a chamber for containing the lubricant, and at the other side is mounted a spring which causes the piston to exert pressure constantly on the lubricant. An outlet pipe disposed axially of the cylinder is in communication with the lubricant chamber, and therefore receives lubricant therefrom under pressure.

An ejecting plunger moves in the outlet tube, within certain limits, and thus measures the amount of lubricant which may be stored in the outlet tube in advance of the plunger. The plunger has a check valve controlled passage permitting the lubricant to flow in front of the plunger, and this valve is adapted to close when the plunger is moved for the purpose of expelling the lubricant.

A further feature of the invention resides in the nozzle of the outlet tube, which is normally closed by a spring pressed check valve. A special fitting is designed for application at the part to be lubricated, and when the nozzle is connected to the fitting, the valve is opened. Preferably, a locking means is provided between the fitting and the nozzle to maintain the proper relation and communication between these parts. The fitting also may be normally closed by a check valve, and in such case, this valve is opened by a stem extending from the check valve in the nozzle, when the parts are properly connected.

The invention is fully disclosed by way of example in the following description and in the accompanying drawings, in which—

Figure 1 is a longitudinal section of the device;

Fig. 2 is a similar section on the line 2—2 of Figure 1 and showing the device arranged for discharging;

Fig. 3 is a transverse section on the line 3—3 of Figure 1;

Fig. 4 is a similar section on the line 4—4 of Figure 1;

Fig. 5 is a similar section on the line 5—5 of Figure 1;

Fig. 6 is a bottom plan view of the gun; and

Fig. 7 is a longitudinal section of a modified construction.

Reference to these views will now be made by use of like characters which are employed to designate corresponding parts throughout.

The body of the device is in the form of a cylinder 1 having its lower end open and flared as indicated by the numeral 2. This end is formed with a series of bayonet slots 3 and is lined with a ring 4 which constitutes a packing for said opening.

Over the flared open end is fitted a cap 5 having studs 6 received in the bayonet slots as clearly shown in Figures 1 and 7. The cap is further formed with a number of ports 7 and with a downwardly extending central boss 8 into which is fitted the lower end of an outlet tube 9. This tube is disposed axially of the cylinder and extends nearly to the upper end thereof. Into the lower end of the tube is fitted a liner 10 having slots 11 near the upper end thereof. In the tube is also mounted an axial stem 12 carrying at its upper end a spider 13. The stem is surrounded by a spring 14 bearing against the spider 13 and the upper end of the liner 10. An internally flanged ring 15 screwed on the upper end of the tube 9 prevents the spider from being expelled from the tube by the spring.

To the lower end of the stem is attached an ejecting plunger 16 having a sliding fit in the liner 10. When the plunger is retracted to its innermost position, as in Figure 1, it is still within the liner 10, so that this liner and the spider 13 serve as guide members which maintain the stem 12 axially of the tube 9.

In the top of the cylinder 1 is fitted a gland 17 through which slides a rod 18 having at its upper end a push disk 19. The lower end engages the spider 13 and is further formed with a collar 20 which may abut the gland 17 to determine the outermost position of the rod.

A piston 21 slidable on the tube 9 divides the cylinder 1 into two chambers 22 and 23. The former contains lubricant which is permitted by means of the spider 13 to flow into the tube 9. The other compartment contains a spring 24 bearing against the piston 21 to maintain the lubricant in the chamber 22 under pressure.

When the stem 12 and the plunger 16 are retracted to their normal or innermost position by the expansion of the spring 14, as in Figure 1, the plunger partly uncovers the slots 11. This provides a means by which the lubricant may be forced into the liner 10 or to the space in advance of the plunger. Moreover, the plunger is hollow, and the interior thereof communicates with a T-shaped passage 25 formed in the lower end of the stem 12 and communicating with that portion of the tube 9 above the plunger. The passages continue through the plunger by means of a port 26 in the face of the latter, whereby another means of communication from one side of the plunger to the other is provided. The plunger contains a spring 27 for the purpose of maintaining a ball valve 28 normally in closing relation to the passage 25. This spring however is not of sufficient strength to resist the pressure on the lubricant caused by the spring 24 and the piston 21.

On the outer extremity of the boss 8 is threaded a nozzle 30 between which and the end of the liner 10 is clamped another spider 31. A stem 32 has one end fixed to this spider and the other end formed with a valve head 33. The stem has a reduced extension 34 on the other side of the stem for the purpose presently to be described. A valve seat member 35 slides within the nozzle and is adapted to close upon the head 33 when in its outermost position.

A spring 36 interposed between the spider 21 and the valve seat member normally retains the latter closed on the head. A lifting disk 37 with a central opening 38 is engaged by the lower end of the valve seat member and rests on a pair of interior lugs 39 on the nozzle 30. These lugs obviously prevent the lifting member from being expelled through the nozzle.

The part to be lubricated is equipped with a tubular fitting 40 having threads 41 for the purpose of attachment. The upper end of this member is formed with a valve seat 42 and the lower end with an internal flange 43. A ball valve 44 normally closes the seat under the action of a spring 45 bearing against it and the flange 43. The upper portion of the fitting 40 has facets 46 and a peripheral groove 47. In applying the gun to the fitting, the latter by means of its facets is caused to pass between the lugs 39. In doing so, pressure on the cylinder or body of the grease gun is required to overcome the spring 36, and at the same time the valve seat member 35 is removed from the head 33 by the lifting disk 37 which directly engages the fitting. The gun is now turned on its axis so that the wider portion of the fitting is brought over the lugs 39 and are thus locked in the deeper parts of the peripheral groove 47. While the nozzle is being pushed over the fitting, the extension 34 moves the ball valve 44 from its seat, inasmuch as the extension is of such length as to engage the ball valve when the spring 36 is fully compressed as in Figure 2.

In describing the operation of the device it is to be noted that the spider 13 in engaging the nut 15 defines a constant or limited position of the plunger 16 in the tube 9. Consequently, the volume of lubricant contained in the liner 10 when the spring 14 is expanded is constant. After application of the nozzle to the fitting in the manner described, the rod 18 is pushed inwardly by application of hand pressure to the disk 19. The ball valve 28 closes on the downward movement of the plunger, and after a short movement of the latter, the slots 11 are also covered. The lubricant trapped in advance of the plunger is now injected directly into the fitting 40.

It will be seen that the base of the disk 37 has a washer 48 which fits over the top of the fitting and thus prevents escape of lubricant. For a similar reason the valve seat member 35 carries a peripheral packing 50 engaging the inner wall of the nozzle to prevent leakage through the nozzle when delivery of lubricant is not intended.

In the modification shown in Figure 7 an auxiliary valve is provided for maintaining vacuum in the liner 10' when the plunger is retracted and the valve 33—35 closed after a charge of lubricant has been injected into a bearing and the gun withdrawn from the bearing. It will be seen that the liner 10' is somewhat thicker than in the previously described construction, and the lower end of the liner is formed with a conical valve seat 49. A valve 50' loosely mounted within the seat end floats freely in the lower end of the liner, resting on the spider 31 when the nozzle 30' is pointed downwardly. When the gun is withdrawn from the bearing after the injection of a charge of lubricant into the latter, the valve 33—35 closes in the manner already described. When the plunger is withdrawn, a vacuum tends to form in the liner 10', and it is desirable that the lower end of the liner be tightly closed to prevent the drawing of foreign matter into the gun and also to maintain the vacuum as near perfect as possible in order to facilitate the prompt filling of the liner with lubricant when the plunger uncovers the slots 11. It will be apparent that under these conditions the valve 50 will close firmly against the seat 49 and will thereby improve the closure of the liner to the atmosphere.

Although specific embodiments of the invention have been illustrated and described, it will be understood that various alterations in the details of construction may be made without departing from the scope of the invention as indicated by the appended claims.

What I claim is:—

1. A grease gun comprising a cylinder forming a pressure chamber, an outlet tube in communication with said chamber, a liner disposed in said tube near the outlet end thereof and extending into said cylinder, said liner being slotted at a point considerably inward of the forward end of said cylinder, a plunger slidable within said liner along the slotted portion thereof and adapted to obstruct said liner beyond said slotted portion.

2. A grease gun comprising a cylinder forming a pressure chamber, an outlet tube in communication with said chamber, a liner disposed in said tube near the outlet end thereof and extending into said cylinder, said liner being slotted at a point considerably inward of the forward end of said cylinder, a plunger slidable within said liner along the slotted portion thereof and adapted to obstruct said liner beyond said slotted portion, said plunger having a passage therethrough permitting communication from one side thereof to the other, and a check valve controlling said passage and adapted to close on the ejection stroke.

3. A grease gun comprising a cylinder forming a pressure chamber, an outlet tube in communication with said chamber, a liner disposed in said tube near the outlet end thereof, said liner being slotted at its inner end, a plunger slidable within said liner along the slotted end thereof and adapted to obstruct said liner beyond said end.

4. A grease gun comprising a cylinder forming a pressure chamber, an outlet tube in communication with said chamber, a liner disposed in said tube near the outlet end thereof, said liner being slotted at its inner end, a plunger slidable within said liner along the slotted end thereof and adapted to obstruct said liner beyond said end, said plunger having a passage therethrough permitting communication from one side thereof to the other, and a check valve controlling said passage and adapted to close on the ejection stroke.

5. A grease gun comprising a cylinder, a piston slidably mounted in the cylinder and dividing the same into two compartments, a spring disposed in one of said compartments and acting on said piston, an outlet tube extending a considerable distance into said cylinder and communicating with the other compartment, said tube having its outlet end disposed exteriorly of said cylinder, said tube passing through the piston and permitting sliding movement of the latter thereon, a liner disposed in said tube near the outlet end thereof and extending into said cylinder, said liner being slotted at a point considerably inward of the forward end of said cylinder, an ejecting plunger slidably mounted in the liner and adapted to obstruct the slotted portion, and means of communication from one side of said plunger to the other side.

6. A grease gun comprising a cylinder, a piston slidably mounted in the cylinder and dividing the same into two compartments, a spring disposed in one of said compartments and acting on said piston, an outlet tube communicating with the other compartment and extending to the exterior of said cylinder, said tube passing through the piston and said piston being slidable on said tube, an ejecting plunger slidably mounted in the tube, and means for communication from one side of said plunger to the other side, within the tube, said plunger being adapted to obstruct said means.

In testimony whereof I affix my signature.

PETER GRESSER.